United States Patent
Davis et al.

(10) Patent No.: US 11,209,681 B2
(45) Date of Patent: *Dec. 28, 2021

(54) VIRTUAL REALITY AND/OR AUGMENTED REALITY VIEWER HAVING VARIABLE TRANSPARENCY

(71) Applicant: Disney Enterprises, Inc., Burbank, CA (US)

(72) Inventors: Randall Davis, Stevenson Ranch, CA (US); Nathan D. Nocon, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/081,774

(22) Filed: Oct. 27, 2020

(65) Prior Publication Data

US 2021/0041732 A1 Feb. 11, 2021

Related U.S. Application Data

(62) Division of application No. 16/208,339, filed on Dec. 3, 2018, now Pat. No. 10,859,861.

(51) Int. Cl.
*G02C 7/10* (2006.01)
*G02B 27/01* (2006.01)
*G02F 1/133* (2006.01)
*G02F 1/1335* (2006.01)

(52) U.S. Cl.
CPC ....... *G02F 1/13318* (2013.01); *G02B 27/017* (2013.01); *G02C 7/102* (2013.01); *G02F 1/133626* (2021.01)

(58) Field of Classification Search
None
See application file for complete search history.

(56) References Cited

U.S. PATENT DOCUMENTS

| 9,158,115 | B1* | 10/2015 | Worley | G02B 30/26 |
|---|---|---|---|---|
| 10,129,984 | B1* | 11/2018 | Lamkin | H05K 1/189 |
| 10,371,944 | B2* | 8/2019 | Mallinson | G02B 27/0172 |
| 10,466,480 | B2* | 11/2019 | Schowengerdt | G06T 5/002 |
| 10,594,951 | B2* | 3/2020 | Lamkin | G06T 7/557 |
| 10,627,565 | B1* | 4/2020 | Trail | G02B 3/14 |
| 2017/0108697 | A1* | 4/2017 | El-Ghoroury | G02B 27/0081 |
| 2018/0088330 | A1* | 3/2018 | Giannuzzi | G06F 3/0304 |
| 2018/0188538 | A1* | 7/2018 | Bell | G02F 1/133528 |

* cited by examiner

*Primary Examiner* — Duane N Taylor, Jr.
(74) *Attorney, Agent, or Firm* — Farjami & Farjami LLP

(57) ABSTRACT

According to one implementation, a dual-mode augmented reality and virtual reality viewer (AR/VR viewer) includes a device configured to provide AR and VR effects, the device including a display screen, a VR shield, and a transparency control unit coupled to the VR shield. The AR/VR viewer also includes a computing platform for generating the AR and VR effects communicatively coupled to the device. The display screen has a user facing first surface for receiving the AR and VR effects, and a second surface opposite the user facing first surface. The display screen or a transmissive layer adjoining the display screen is configured to have a variable transparency. The VR shield is configured to be one of substantially transparent in an AR mode and substantially opaque in a VR mode under the control of the transparency control unit.

15 Claims, 5 Drawing Sheets

VIRTUAL REALITY AND/OR AUGMENTED REALITY VIEWER HAVING VARIABLE TRANSPARENCY

The present application is a Division of U.S. application Ser. No. 16/208,339, filed Dec. 3, 2018, which is hereby incorporated by reference in its entirety into the present application.

BACKGROUND

Advances in computer technology and software have made possible the generation of richly featured and deeply immersive augmented reality (AR) and virtual reality (VR) experiences for users. AR and VR experiences may merge virtual objects or characters with real-world features in a way that can, in principle, provide a powerfully interactive experience. VR can augment a virtual rendition of the real world, where the view of the real world comes from a headset mounted camera that is projected into VR space. AR can augment real-world images, i.e., a user can see the real world through clear lenses with virtual projections on top. However, because AR virtual effects are overlaid on real-world images, conventional systems providing AR experiences tend to underperform in bright daylight conditions in which the AR effects typically appear washed out or become too faded to provide the desired user experience.

SUMMARY

There are provided virtual reality (VR) and/or augmented reality (AR) viewers having variable transparency, substantially as shown in and/or described in connection with at least one of the figures, and as set forth more completely in the claims.

DETAILED DESCRIPTION

Figure 1:
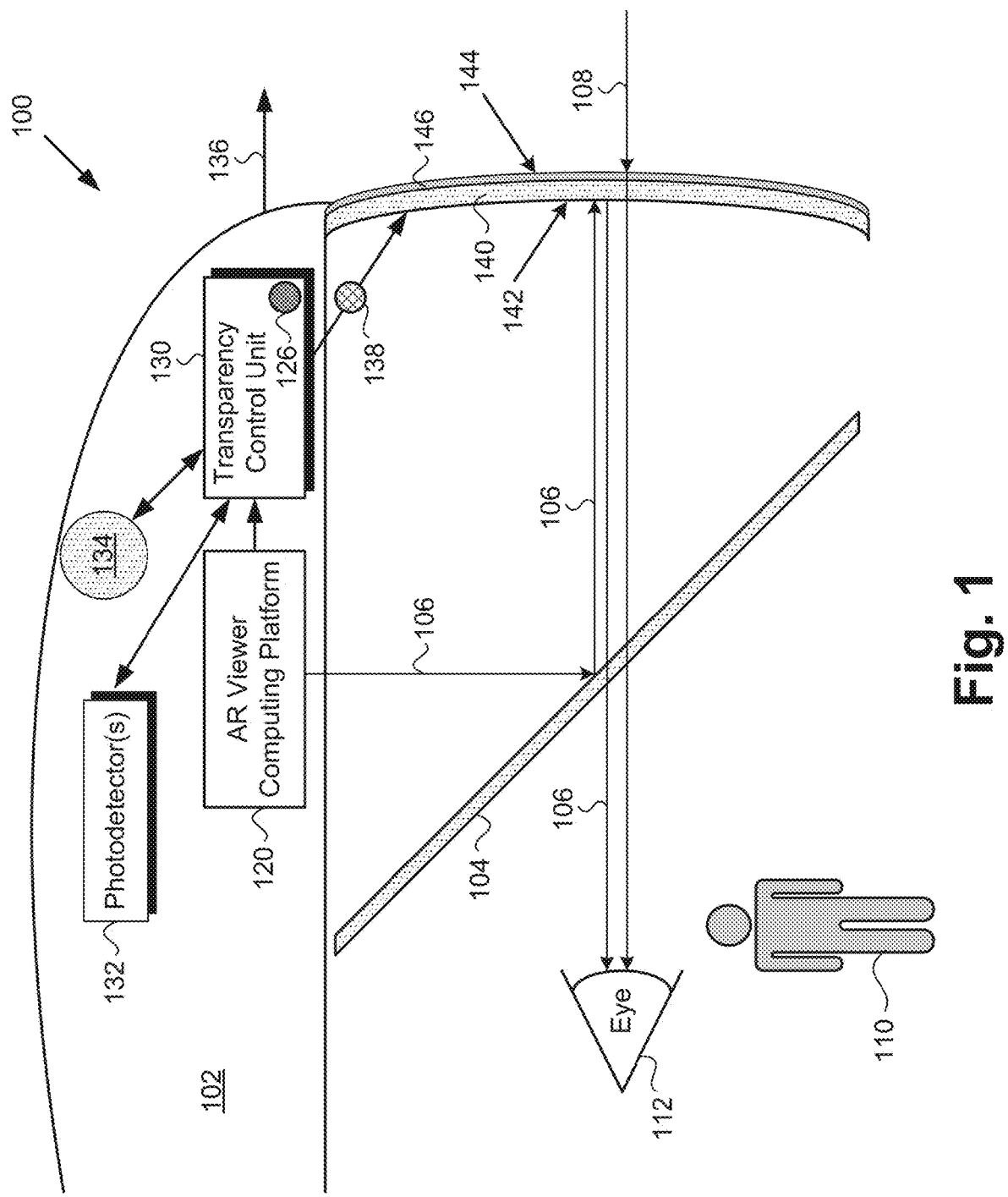
FIG. 1 shows a diagram of an exemplary augmented reality (AR) viewer having variable transparency, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses various implementations of a virtual reality (VR) and/or augmented reality (AR) viewer having variable transparency. FIG. 1 shows a diagram of exemplary AR viewer 100 having variable transparency, according to one implementation. It is noted that AR viewer 100 is depicted in a use environment including wearer or user 110 of AR viewer 100 (hereinafter "user 110") having eye 112 viewing AR effects 106 and real-world images 108. As described herein, "real-world images" may refer to images formed from ambient light of an AR user's real and physical surroundings, while "AR effects" may refer to virtual images that are rendered or augmented by a display device to provide a desired visual effect.

As shown in FIG. 1, AR viewer 100 includes device 102 configured to provide AR effects 106 generated by AR viewer computing platform 120. It is noted that a "device" may refer to a display device worn over user 110's head, face, or eyes, so as to direct, project or render light for AR effects 106 and/or real world images 108 to eye 112 of user 110. This may take the form of a head-mounted display (HMD) implemented as a helmet, goggles, glasses, and the like. In addition, AR viewer 100 includes display screen 140 device 102 having user facing first surface 142 configured to receive AR effects 106 and second surface 144 opposite user facing first surface 142 and configured to receive real-world images 108.

Display screen 140 also includes material 146 causing display screen 140 to have variable transparency. In one implementation, material 146 may be provided as a transmissive layer adjoining user facing first surface 142 or second surface 144, or may be integrated material of display screen 140 (as shown). For example, when implemented as a transmissive layer, material 146 may be applied/adhered to display screen 140 as a layer of film. When integrated with display screen 140, material 146 may be dispersed throughout display screen 140 in a mixture or polymer during manufacture. In another implementation, material 146 may be provided as a separate component that can be attached or placed over display screen 140. For example, material 146 may be a separate visor that can manually or automatically "drop down" from device 102 and over display screen 140. For the reasons discussed above, material 146 will hereinafter be referred to as "material/transmissive layer 146".

Also shown in FIG. 1 are exemplary rendering, directing or projecting optics 104 of AR viewer 100 and front facing camera 134 for capturing images in forward direction 136 relative to user 110 of AR viewer 100. AR viewer 100 may further include optional one or more photodetectors 132 (hereinafter "photodetector(s) 132"), and transparency control unit 130 having user interface 126 and configured to provide transparency control signal 138 to display screen 140.

According to the exemplary implementation shown in FIG. 1, AR viewer computing platform 120 generates AR effects 106 and provides AR effects 106 downward toward optics 104, which may be implemented as an angled half-silvered beam splitter configured to redirect a portion of the intensity of AR effects 106 to user facing first surface 142 of display screen 140. User facing first surface 142, which may also be half-silvered, reflects AR effects 106 backward towards eye 112 of user 110. Eye 112 of user 110 also receives real-world images 108 that are overlaid by AR effects 106 to result in an optical AR experience for user 110.

It is noted that the specific optics rendering, directing or projecting scheme depicted in FIG. 1 is merely exemplary, and is provided in the interests of conceptual clarity. In other implementations, other optics schemes for merging AR effects 106 with real-world images 108 may be utilized without affecting the novel and inventive aspects of AR viewer 100.

As noted above, because AR effects 106 are overlaid on real-world images 108, conventional systems providing AR experiences tend to underperform in bright daylight conditions in which AR effects 106 typically appear washed out or become too faded to provide the desired user experience. AR viewer 100 addresses and overcomes this deficiency in the conventional art by including display screen 140 configured to have variable transparency in response to ambient light intensity.

In some implementations, display screen 140 may include material/transmissive layer 146 in the form of an ultraviolet (UV) light sensitive material configured to vary in transparency automatically in response to UV light, i.e., to darken in response to UV light. In those implementations, AR viewer 100 may include device 102 configured to provide AR effects 106, and display screen 140 including UV light sensitive material/transmissive layer 146, but may omit transparency control unit 130 and photodetectors 132. Moreover, in some of those implementations, AR viewer computing platform 120 may be provided by a modular device, such as a smartphone or other mobile communication device that is communicatively coupled to, but not physically integrated with, AR viewer 100.

In other implementations, AR viewer 100 may include transparency control unit 130 coupled to display screen 140 and configured to control the variable transparency of display screen 140. Transparency control unit 130 may monitor the ambient light intensity using photodetector(s) 132 and/or front facing camera 134. Front facing camera 134 may be implemented as one or more RGB video cameras, for example. Photodetector(s) 134 may include photodiodes and/or any other suitable sensors for detecting ambient light intensity.

For example, when transparency control unit 130 senses that the ambient light intensity has reached or exceeded a predetermined threshold intensity, transparency control unit 130 may output transparency control signal 138 to display 140 to cause the transparency of display screen 140 to change automatically, i.e., display screen 140 darkens automatically so as to become less transparent. By analogy, when transparency control unit 130 senses that the ambient light intensity has fallen below a predetermined threshold intensity, transparency control unit 130 may output transparency control signal 138 to display 140 to cause the transparency of display screen 140 to change automatically, i.e., display screen 140 becomes less dark automatically so as to be more transparent.

In implementations in which AR viewer 100 includes transparency control unit 130, display screen 140 may include material/transmissive layer 146 in the form of an electrochromic material configured to vary in transparency in response to an applied voltage, i.e., to become more or less darkly tinted in response to the applied voltage. Thus, in those implementations, transparency control signal 138 may be a voltage signal applied to display screen 140 by transparency control unit 130.

In some implementations, transparency control unit 130 may be configured to adjust the variable transparency of display screen 140 based on an input received from user 110. For example, user 110 may utilize user interface 126 to vary the transparency of display screen 140 manually. Moreover, in some implementations, user 110 may utilize user interface 126 to calibrate the transparency of display screen 140, for example by manually setting a preferred default or baseline transparency level for display screen 140, i.e., the user preferred default or baseline transparency level of material/transmissive layer 146. User interface 126 may be touchscreen or voice activated, or may be implemented as a mechanical device such as one or more buttons, dials, switches, or sliders, for example.

Figure 2:
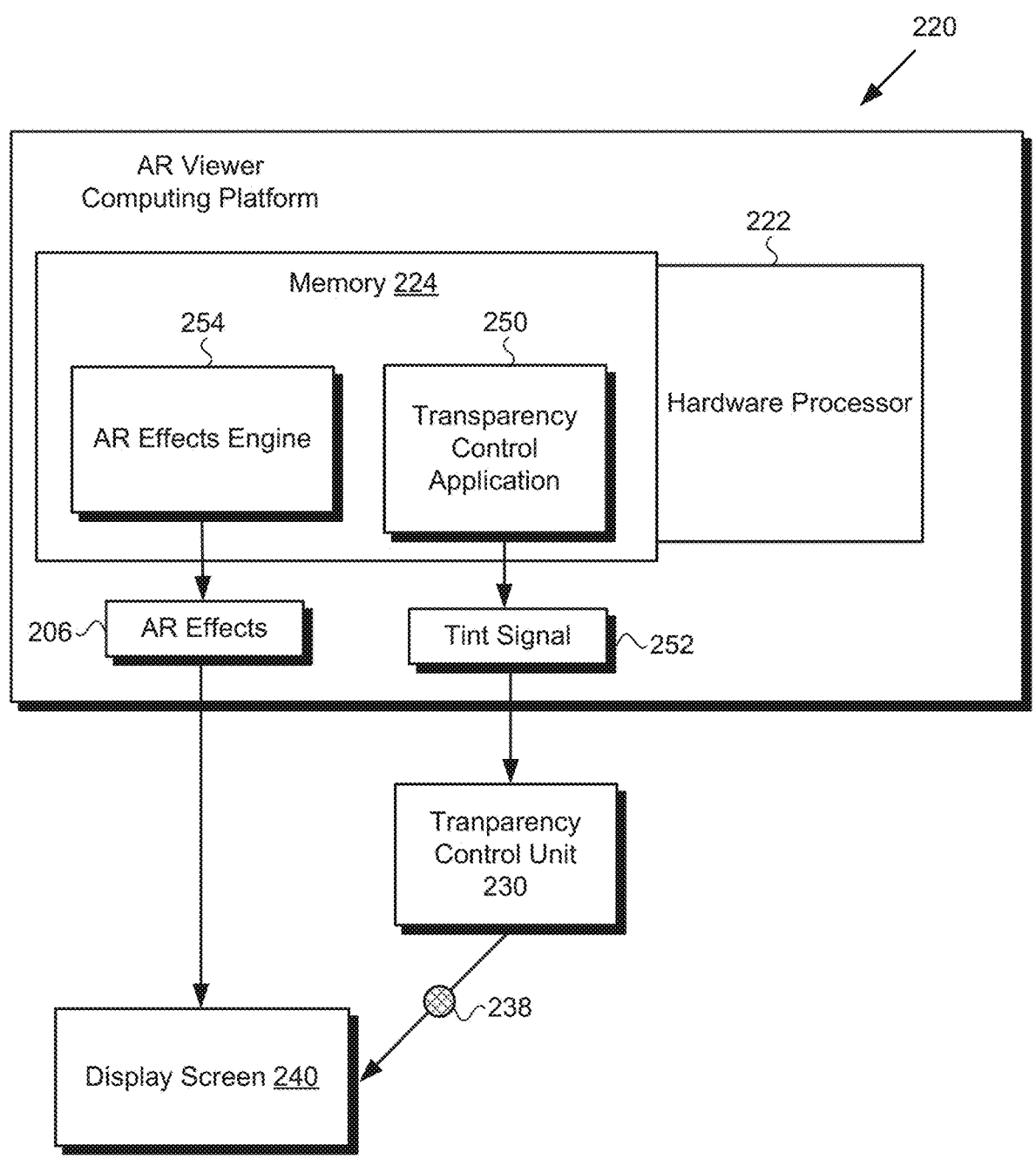
FIG. 2 shows a diagram of an exemplary computing platform suitable for use with an AR viewer having variable transparency, according to one implementation.

FIG. 2 shows a diagram of an exemplary computing platform suitable for use with AR viewer 100 having variable transparency, according to one implementation. As shown in FIG. 2, exemplary AR viewer computing platform 220 includes hardware processor 222, and memory 224 implemented as a non-transitory storage device storing transparency control application 250 and AR effects engine 254. As further shown in FIG. 2, AR effects engine 254 generates AR effects 206, and transparency control application 250 generates tint signal 252. Also shown in FIG. 2 are display screen 240, transparency control unit 230 coupled to display screen 240, and transparency control signal 238 output to display screen 240 by transparency control unit 230.

Display screen 240, transparency control unit 230, and transparency control signal 238 correspond respectively in general to display screen 140, transparency control unit 130, and transparency control signal 138, in FIG. 1. That is to say, display screen 240, transparency control unit 230, and transparency control signal 238 may share any of the characteristics attributed to respective display screen 140, transparency control unit 130, and transparency control signal 138 by the present disclosure, and vice versa. Thus, like display screen 140, display screen 240 includes user facing first surface 142, second surface 144 opposite user facing first surface 142, and material/transmissive layer 146 causing display screen 140 to have a variable transparency.

Moreover, AR viewer computing platform 220 corresponds in general to AR viewer computing platform 120, in FIG. 1, and those corresponding features may share any of the characteristics attributed to either corresponding feature by the present disclosure. Consequently, although not shown in FIG. 1, AR viewer computing platform 120 may include features corresponding to hardware processor 222 and memory 224 storing transparency control application 250 and AR effects engine 254.

It is noted that in some implementations, AR viewer computing platform 120/220 may be a modular device, such as a smartphone or other mobile communication device, to which AR viewer 100 is communicatively coupled, but not physically integrated. However, in other implementations, AR viewer computing platform 120/220 may be an integrated component of device 102.

Hardware processor 222 may be the central processing unit (CPU) for AR viewer computing platform 120/220, for example, in which role hardware processor 222 runs the firmware and/or operating system for AR viewer computing platform 120/220 and executes transparency control application 250 and AR effects engine 254. In some implementations, hardware processor 222 may comprise a plurality of processing units, such as one or more CPUs and one or more graphics processing units (GPUs). AR viewer computing platform 120/220 can utilize transparency control application 250 to generate tint signal 252 for use by transparency control unit 130/230 to control the transparency of display screen 140/240. Thus, according to the exemplary implementation shown in FIG. 2, transparency control unit 130/230 may be configured to adjust the variable transparency of display screen 140/240 based on one or more commands in the form of tint signal 252 from AR viewer computing platform 120/220.

Figure 3A:
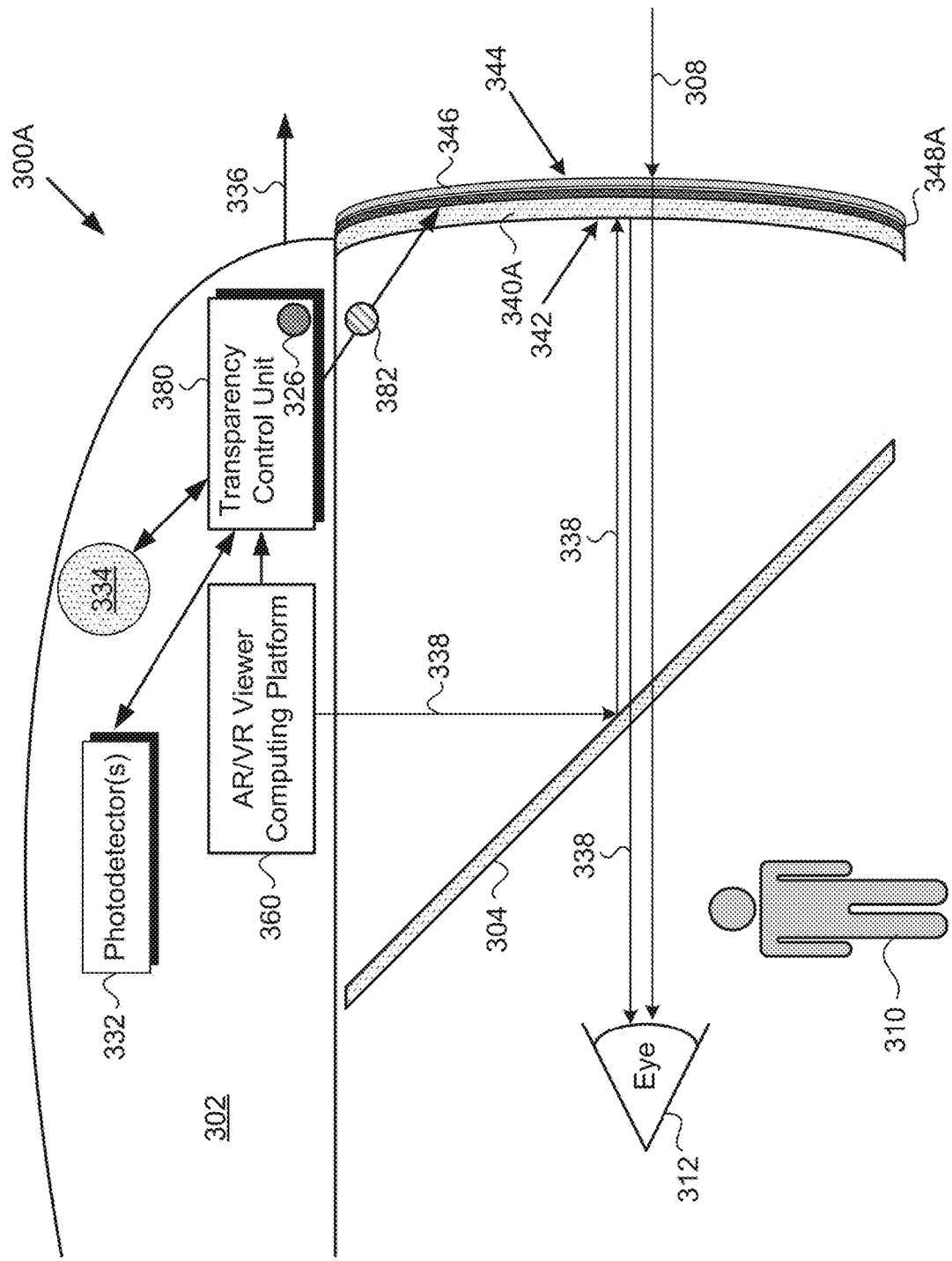
FIG. 3A shows a diagram of an exemplary dual-mode AR and virtual reality (VR) viewer having variable transparency, according to one implementation.

FIG. 3A shows a diagram of exemplary dual-mode AR and VR viewer (hereinafter "AR/VR viewer") 300A having variable transparency, according to one implementation. It is noted that AR/VR viewer 300A is depicted in a use environment including wearer or user 310 of AR/VR viewer 300A (hereinafter "user 310") having eye 312 viewing AR and VR effects 338 (hereinafter "AR/VR effects 338") and/or real world images 308.

As shown in FIG. 3A, AR/VR viewer 300A includes device 302 configured to provide AR/VR effects 338 generated by AR/VR viewer computing platform 360. Device 302 includes display screen 340A, VR shield 348A integrated with display screen 340A, and transparency control unit 380 having user interface 326.

As further shown in FIG. 3A, display screen 340A of AR/VR viewer 300A has user facing first surface 342 configured to receive AR/VR effects 338 and second surface 344 opposite user facing first surface 342 and configured to receive real-world images 308. Display screen 340A also includes material 346 causing display screen 340A to have variable transparency. In one implementation, material 346 may be provided as a transmissive layer adjoining user facing first surface 342 or second surface 344, or may be integrated material of display screen 340A (as shown). For example, when implemented as a transmissive layer, material 346 may be applied/adhered to display screen 340A as a layer of film. When integrated with display screen 340A, material 346 may be dispersed throughout display screen 340A in a mixture or polymer during manufacture. For the reasons discussed above, material 346 will hereinafter be referred to as "material/transmissive layer 346".

AR/VR viewer 300A may further include exemplary optics 304 of AR/VR viewer 300A and front facing camera 334 for capturing images in forward direction 336 relative to user 310 of AR/VR viewer 300A. Also shown in FIG. 3A are optional one or more photodetectors 332 (hereinafter "photodetector(s) 332"), and transparency and/or opacity control signal 382 (hereinafter "transparency/opacity control signal 382").

According to the exemplary implementation shown in FIG. 3A, AR/VR viewer computing platform 360 generates AR/VR effects 338 and provides AR/VR effects 338 downward toward optics 304, which may be implemented as an angled half-silvered beam splitter configured to redirect a portion of the intensity of AR/VR effects 338 to user facing first surface 342 of display screen 340A. User facing first surface 342, which may also be half-silvered, reflects AR/VR effects 338 backward towards eye 312 of user 310. Eye 312 of user 310 may also receive real-world images 308 that may be overlaid by AR/VR effects 338 to result in an optical AR experience for user 310.

It is noted that the specific scheme depicted in FIG. 3A is merely exemplary, and is provided in the interests of conceptual clarity. In other implementations, other optics schemes for merging AR/VR effects 338 with real-world images 308 may be utilized without affecting the novel and inventive aspects of AR/VR viewer 300A.

Display screen 340A of AR/VR viewer 300A is configured to have a variable transparency in response to ambient light intensity. In addition, AR/VR viewer 300A can be selectively used in AR or VR mode due to the presence of VR shield 348A. It is noted that VR shield 348A, under the control of transparency control unit 380, is configured to be one of substantially transparent in AR mode and substantially opaque in VR mode. It is further noted that VR shield 348A is depicted as though in a darkened, substantially opaque state corresponding to VR mode merely for illustrative purposes.

In some implementations, display screen 340A may include material/transmissive layer 346 in the form of a UV light sensitive material configured to vary in transparency automatically in response to UV light, i.e., to darken in response to UV light. In those implementations, and where, as in FIG. 3A, VR shield 348A is integrated with display screen 340A, VR shield 348A may be situated between UV light sensitive material/transmissive layer 346 and user facing first surface 342 of display screen 340A. Thus, in those implementations, AR/VR viewer 300A may be used in AR mode through use of transparency control unit 380 to place VR shield 348A in a substantially transparent state while UV light sensitive material/transmissive layer 346 responds to the presence of ambient UV light intensity automatically without requiring control by transparency control unit 380.

In other implementations, transparency control unit 380 of AR/VR viewer 300A may further control the transparency of material/transmissive layer 346 of display screen 340A. For example, transparency control unit 380 may monitor the ambient light intensity using photodetector(s) 332 and/or front facing camera 334. Front facing camera 334 may be implemented as one or more RGB video cameras, for example. Photodetector(s) 334 may include photodiodes and/or any other suitable sensors for detecting ambient light intensity.

As a specific example, when transparency control unit 380 senses that the ambient light intensity has reached or exceeded a predetermined threshold intensity, transparency control unit 380 may output transparency/opacity control signal 382 to display screen 340A to cause the transparency of material/transmissive layer 346 of display screen 340A to change automatically, i.e., material/transmissive layer 346 darkens automatically so as to make display screen 340A less transparent. By analogy, when transparency control unit 380 senses that the ambient light intensity has fallen below a predetermined threshold intensity, transparency control unit 380 may output transparency/opacity control signal 382 to display 340A to cause the transparency of material/transmissive layer 346 of display screen 340A to change automatically, i.e., material/transmissive layer 346 becomes less dark automatically so as make display screen 340A more transparent.

In implementations in which AR/VR viewer 300A utilizes transparency control unit 380 to control the transparency of material/transmissive layer 346 of display screen 340A, material/transmissive layer 346 may take the form of an electrochromic material configured to vary in transparency in response to an applied voltage, i.e., to become more or less darkly tinted in response to the applied voltage. Thus, in those implementations, transparency/opacity control signal 382 may include a voltage signal applied to material/transmissive layer 346 of display screen 340A by transparency control unit 380.

As noted above, transparency/opacity signal 382 may also be used to transition VR shield 348A between substantially transparent and substantially opaque. VR shield 348A may include a liquid-crystal material, such as a polymer-dispersed liquid-crystal (PDLC), for example. It is noted that the term "polymer-dispersed liquid-crystal" or "PDLC" refers to a material in which liquid crystals dispersed in a polymer film align in response to an applied control voltage, thereby causing the PDLC material to transition between substantially opaque and substantially transparent. Thus, in implementations in which VR shield 348A includes a PDLC, transparency/opacity control signal 382 may include a voltage signal applied to VR shield 348A of display screen 340A by transparency control unit 380.

In some implementations, transparency control unit 380 may be configured to adjust the variable transparency of material/transmissive layer 346 and/or the transparency or opacity of VR shield 348A based on one or more inputs received from user 310. For example, user 310 may utilize user interface 326 to vary the transparency of display screen 340A manually. User interface 326 may be touchscreen or voice activated, or may be implemented as a mechanical device such as one or more buttons, dials, switches, or sliders, for example.

For instance, in AR mode in which VR shield 348A is substantially transparent, user 310 may utilize user interface 326 to manually adjust the transparency of material/transmissive layer 346, and thereby the transparency of display screen 340A. Moreover, in some implementations, user 310 may utilize user interface 326 to switch VR shield 348A between AR mode and VR mode, i.e., to switch the transparency of VR shield 348A between substantially transparent in AR mode to substantially opaque in VR mode. It is noted that, in some implementations, user 310 may utilize user interface 326 to calibrate the transparency of display screen 340A, for example by manually setting a preferred default or baseline transparency level for display screen 340A, i.e., the user preferred default or baseline transparency level of material/transmissive layer 346.

Figure 3B:
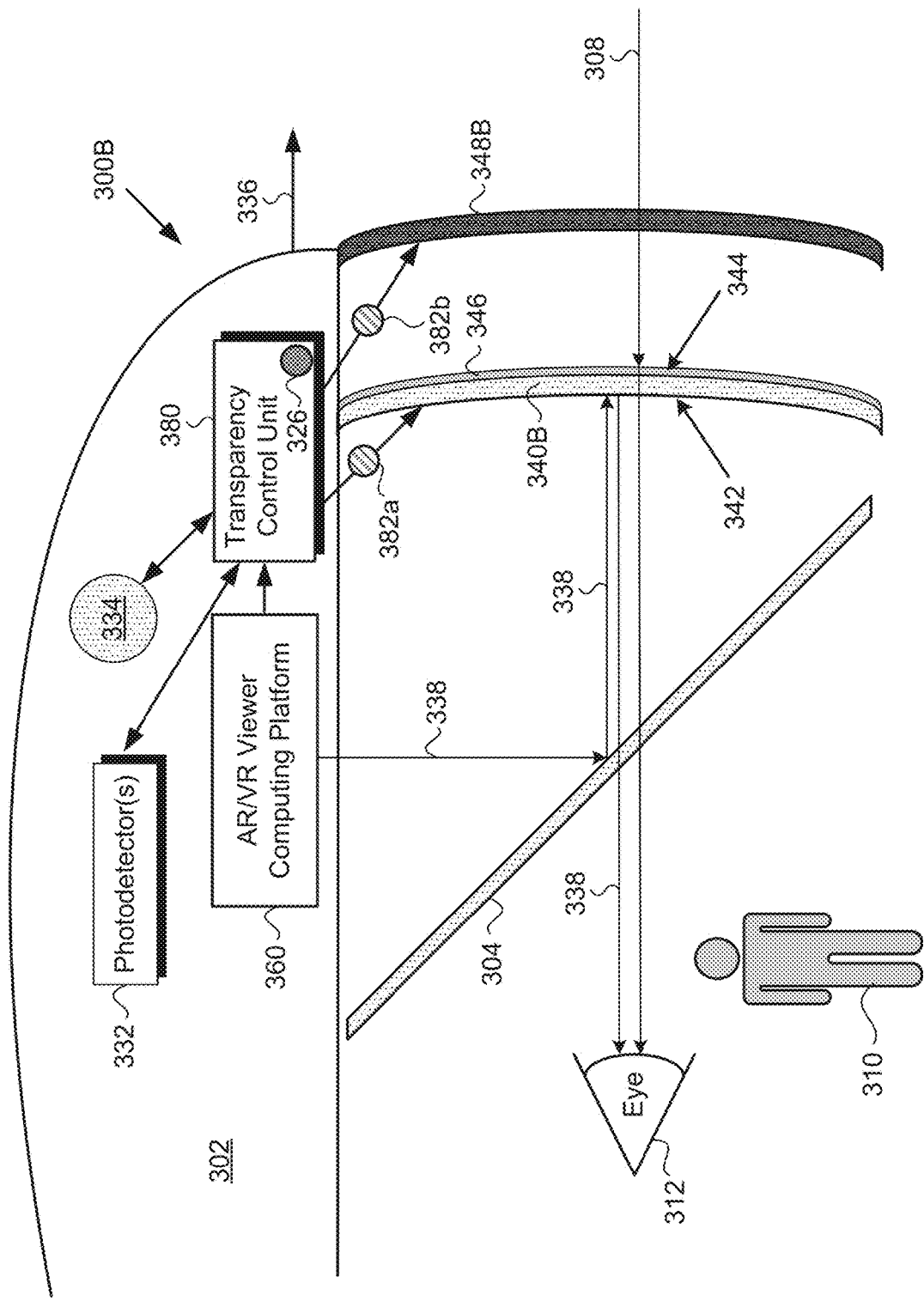
FIG. 3B shows a diagram of an exemplary dual-mode AR and VR viewer having variable transparency, according to another implementation.

FIG. 3B shows a diagram of exemplary dual-mode AR/VR viewer 300B having variable transparency, according to another implementation. It is noted that features of AR/VR viewer 300B identified by reference numbers identical to those shown in FIG. 3A correspond respectively to those previously described features and may share any of the characteristics attributed to those corresponding features above. AR/VR viewer 300B differs from AR/VR viewer 300A in that, in contrast to AR/VR viewer 300A, VR shield 348B of AR/VR viewer 300B is implemented as a shield separate from display screen 340B of AR/VR viewer 300B. That is to say, according to the exemplary implementation shown in FIG. 3B, VR shield 348B is not integrated with display screen 340B.

In addition, VR shield 348B and display screen 340B are independently coupled to transparency control unit 380 in the implementation shown in FIG. 3B. Thus, transparency control unit 380 may be configured to provide transparency control signal 382a to display screen 340B, and to provide opacity control signal 382b to VR shield 348B. Nevertheless, AR/VR viewer 300B shares substantially all of the functionality attributed to AR/VR viewer 300A, above.

Figure 4:
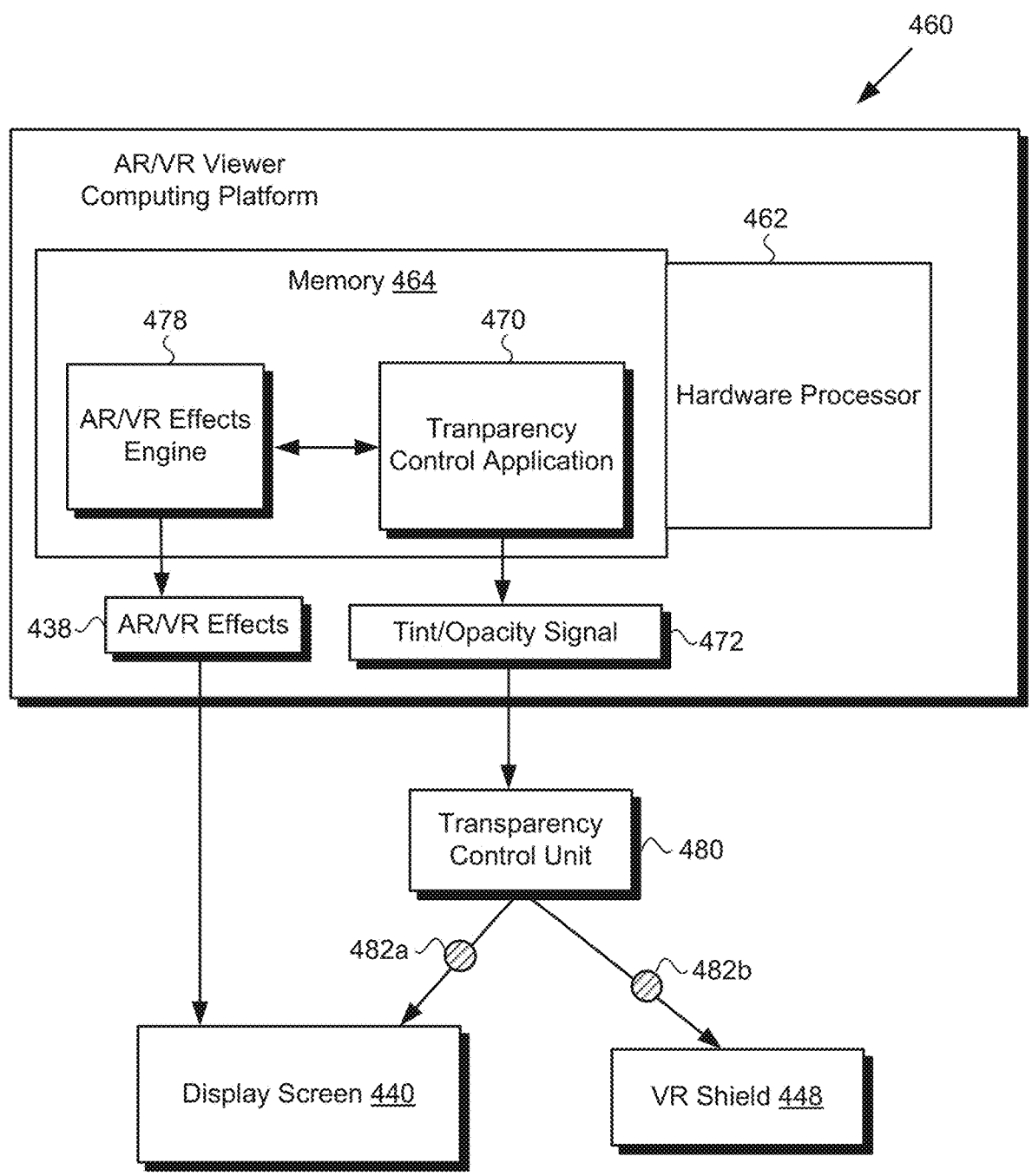
FIG. 4 shows a diagram of an exemplary computing platform suitable for use with a dual-mode AR and VR viewer having variable transparency, according to one implementation.

FIG. 4 shows a diagram of an exemplary computing platform suitable for use with dual-mode AR/VR viewer 300A/300B having variable transparency, according to one implementation. As shown in FIG. 4, exemplary AR/VR viewer computing platform 460 includes hardware processor 462, and memory 464 implemented as a non-transitory storage device storing transparency control application 470 and AR/VR effects engine 478 communicatively coupled to transparency control application. As further shown in FIG. 4, AR/VR effects engine 478 generates AR/VR effects 438, and transparency control application 470 generates tint/opacity signal 472. Also shown in FIG. 4 are display screen 440, VR shield 448, transparency control unit 480 coupled to display screen 440 and VR shield 448, transparency control signal 482a output to display screen 440 by transparency control unit 480, and opacity control signal 482b output to VR shield 448 by transparency control unit 480.

It is noted that although FIG. 4 represents display screen 440 and VR shield 448 as distinct features receiving distinct respective control signals 482a and 482b, that representation is merely provided for conceptual clarity. Thus, display screen 440 and VR shield 448 may correspond to either or both of respective display screen 340A/340B and VR shield 348A/348B in FIGS. 3A and 3B. In addition, transparency control signal 482a and opacity control signal 482b correspond respectively to transparency control signal 382a and opacity control signal 372b, in FIG. 3B, while the combination of transparency control signal 482a and opacity control signal 482b corresponds to transparency/opacity control signal 382, in FIG. 3A.

Transparency control unit 480 corresponds in general to transparency control unit 380, in FIGS. 3A and 3B. That is to say, transparency control unit 480 may share any of the characteristics attributed to transparency control unit 380 by the present disclosure, and vice versa. Moreover, AR/VR viewer computing platform 460 corresponds in general to AR/VR viewer computing platform 360, in FIGS. 3A and 3B, and those corresponding features may share any of the characteristics attributed to either corresponding feature by the present disclosure. Consequently, although not shown in FIGS. 3A and 3B, AR viewer computing platform 360 may include features corresponding to hardware processor 462 and memory 464 storing transparency control application 470 communicatively coupled to AR/VR effects engine 478.

It is noted that in some implementations, AR/VR viewer computing platform 360/460 may be a modular device, such as a smartphone or other mobile communication device, to which AR/VR viewer 300A/400A is communicatively coupled, but not physically integrated. However, in other implementations, AR/VR viewer computing platform 360/460 may be an integrated component of device 302.

Hardware processor 462 may be the CPU for AR/VR viewer computing platform 360/460, for example, in which role hardware processor 462 runs the firmware and/or operating system for AR/VR viewer computing platform 360/460 and executes transparency control application 470 and AR/VR effects engine 478. AR/VR viewer computing platform 360/460 can utilize transparency control application 470 to generate tint/opacity signal 472 for use by transparency control unit 380/480 to control the transparency of display screen 340A/340B/440 and/or the transparency or opacity of VR shield 348A/348B/448. In some implementations, hardware processor 462 may comprise a plurality of processing units, such as one or more CPUs and one or more graphics processing units (GPUs).

Thus, according to the exemplary implementation shown in FIG. 4, transparency control unit 380/480 may be configured to adjust the variable transparency of material/transmissive layer 346 of display screen 340A/340B/440 based on one or more commands in the form of tint/opacity signal 472 from AR/VR viewer computing platform 360/460. In addition, transparency control unit 380/480 may be configured to switch VR shield 348A/348B/448 between AR mode and VR mode, i.e., to switch the transparency of VR shield 348A/348B/448 between substantially transparent in AR mode to substantially opaque in VR mode based on one or more commands in the form of tint/opacity signal 472 from AR/VR viewer computing platform 360/460.

As noted above, AR/VR effects engine 478 is communicatively coupled to transparency control application 470. In some implementations, tint/opacity signal 472 generated by transparency control application 470 may be based on content included in AR/VR effects 338/438. For example, where user 310 of AR/VR viewer 300A/300B selects movie content for viewing in VR mode, AR/VR effects engine 478 may communicate that selection to transparency control application 470. In response, transparency control application 470 may generate tint/opacity signal 472 instructing transparency control unit 380/480 to place VR shield 348A/348B/448 in VR mode by rendering VR shield 348A/348B/448 opaque.

In some implementations, AR/VR effects engine 478 may receive instructions relating to tint/opacity signal(s) 472 from an application running executed content on AR/VR viewer computing platform 360/460. For example, the application may be a streaming video application that launches and provides media control for video content. As another example, the application may be a video game application running a game engine. In some implementations, the application running the executed content may identify opacity cues from tags associated with content (e.g. "VR content", "AR content") or from cues that are embedded in content metadata. Upon identification of an opacity cue, the streaming video application may send the instructions relating to the tint/opacity signal(s) 472 to AR/VR effects engine 478 so that commands for generating tint/opacity signal(s) 472 may be communicated to transparency control application 470. It should be understood that in various implementations, transparency control application 470, AR/VR effects engine 478, and an application running executed content may each be separate applications or may be a single application stored in memory 464.

Furthermore, in some implementations, tint/opacity signal 472 generated by transparency control application 470 may change dynamically in response to changing scenes or events within the content included in AR/VR effects 338/438. For example, where user 310 of AR/VR viewer 300A/300B selects an AR or VR game to play, AR/VR effects engine 478 may cause transparency control application 470 to vary tint/opacity signal 472 in response to events occurring dynamically within the game environment. Such a varying tint/opacity signal 472 may result in transparency control unit 380/480 modulating transparency control signal 382/482a sent to display screen 340A/340B/440 and/or opacity control signal 382/482b sent to VR shield 348A/348B/448.

Thus, the present application discloses various implementations of VR and/or AR viewers having variable transparency. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An augmented reality (AR) viewer comprising:
   a display screen having a user facing first surface and a second surface opposite the user facing first surface; and
   a transmissive layer adjoining one of the user facing first surface or the second surface of the display screen;
   wherein the user facing first surface is configured to receive AR effects, and the second surface is configured to receive real-world images;
   wherein one of the display screen or the transmissive layer is configured to have a variable transparency and vary in transparency automatically in response to ambient ultraviolet (UV) light, and wherein the one of the display screen or the transmissive layer comprises a UV light sensitive material.

2. The AR viewer of claim 1, wherein the AR viewer is configured to control the variable transparency of the one of the display screen or the transmissive layer.

3. The AR viewer of claim 2, wherein the one of the display screen or the transmissive layer further comprises an electrochromic material.

4. The AR viewer of claim 2 further comprising:
   at least one of a photodetector or a front facing camera;
   wherein the AR viewer is configured to adjust the variable transparency of the one of the display screen or the transmissive layer automatically, based on an intensity of the ambient UV light detected by the at least one of the photodetector or the front-facing camera.

5. The AR viewer of claim 2, wherein the AR viewer is configured to adjust the variable transparency of the one of the display screen or the transmissive layer based on an input received from a user of the AR viewer.

6. The AR viewer of claim 2, wherein the AR viewer is communicatively coupled to a hardware processor configured to generate the AR effects, and wherein the AR viewer is configured to adjust the variable transparency of the one of the display screen or the transmissive layer based on commands received from the hardware processor.

7. The AR viewer of claim 6, wherein the hardware processor is part of a mobile communication device.

8. The AR viewer of claim 6, wherein the hardware processor is an integrated component of the AR viewer.

9. An augmented reality (AR) viewer comprising:
   a display screen having a user facing first surface and a second surface opposite the user facing first surface;
   a transmissive layer adjoining one of the user facing first surface or the second surface of the display screen; and
   at least one of a photodetector or a front facing camera;
   wherein the user facing first surface is configured to receive AR effects, and the second surface is configured to receive real-world images;
   wherein one of the display screen or the transmissive layer is configured to have a variable transparency and vary in transparency automatically in response to ambient ultraviolet (UV) light, and wherein the AR viewer is configured to adjust the variable transparency of the one of the display screen or the transmissive layer automatically, based on an intensity of the ambient UV light detected by the at least one of the photodetector or the front-facing camera.

10. The AR viewer of claim 9, wherein the one of the display screen or the transmissive layer comprises a UV light sensitive material.

11. The AR viewer of claim 9, wherein the one of the display screen or the transmissive layer comprises an electrochromic material.

12. The AR viewer of claim 9, wherein the AR viewer is further configured to adjust the variable transparency of the one of the display screen or the transmissive layer based on an input received from a user of the AR viewer.

13. The AR viewer of claim 9, wherein the AR viewer is communicatively coupled to a hardware processor configured to generate the AR effects, and wherein the AR viewer is configured to adjust the variable transparency of the one of the display screen or the transmissive layer based on commands received from the hardware processor.

14. The AR viewer of claim 13, wherein the hardware processor is part of a mobile communication device.

15. The AR viewer of claim 13, wherein the hardware processor is an integrated component of the AR viewer.

\* \* \* \* \*